Patented Oct. 20, 1931

1,828,033

UNITED STATES PATENT OFFICE

ARNOLD DOSER, OF COLOGNE-MULHEIM, GUSTAV MAUTHE, OF COLOGNE-HOLWEIDE, AND ALFRED THAUSS, OF COLOGNE-DEUTZ, GERMANY, ASSIGNORS TO GENERAL ANILINE WORKS, INC., OF NEW YORK, N. Y., A CORPORATION OF DELAWARE

NEW PRODUCTS OBTAINABLE FROM RESINS

No Drawing. Application filed March 20, 1928, Serial No. 263,208, and in Germany March 28, 1927.

The present invention relates to new products obtainable from natural resin-acids or condensation products of resin-acids with phenols and to a process of preparing same.

We have found, that when reacting with dehydrating agents, such as zinc chloride, upon natural resin-acids, such as colophony, at temperatures ranging from about 100° to 200° C. water and carbon monoxide are split off. We have further found that when reacting upon the same compounds and the condensation products of resin-acids with phenols (see our copending application Ser. No. 250,332, filed Jan. 28, 1928) with aralkyl halogenides such as benzyl chloride, xylylchloride and chlorobenzylchlorides in the presence of small quantities of a suitable dehydrating agent such as zinc chloride (for example, 1 to 3% calculated on the resinous masses) at temperatures of about 100–200° C., besides water and carbon monoxide, hydrochloric acid and small quantities of a gas which will burn with a luminous flame are evolved whereby probably aralkyl residues enter the molecule of the resin-acids and the resin acid-phenol condensation products and COOH groups are split off. The reaction is complete when the development of gaseous substances ceases. The resinous materials thus obtainable form yellow to red brown masses having higher melting points than the starting materials, soluble in most organic solvents, for instance alcohol, ether, tetrachloromethane, glacial acetic acid, benzene and turpentine. The new materials are soluble in strong sulfuric acid generally with a brown coloration whereby in most cases sulfonation already occurs at room temperature. The sulfonic acids thus obtainable may also be prepared without isolating the unsulfonated products by the addition of strong sulfuric acid, for instance of about 100% strength, to the reaction mixtures at temperatures at which the same are still liquid and cooling in such a manner that the melts always remain liquid. The isolation of the sulfonic acids may be performed by pouring the melts onto ice, separating the aqueous layers, neutralizing them and salting out. In some cases it may be advantageous to add a suitable organic diluent, which is inert to strong sulfuric acid, to the sulfonating mixture.

The sulfonic acids thus obtainable are in the form of their alkali metal salts light yellow to yellow powders, easily soluble in water.

The following examples illustrate our invention without limiting it thereto, the parts being by weight:

Example 1.—10 parts of colophony are gradually heated with 5 parts of benzyl chloride and 0.2 parts of zinc chloride to 120–130° C. As soon as the development of hydrochloric acid ceases the reaction is finished. After cooling, a yellowish brown resinous mass which is easily soluble in alcohol, ether, benzene and turpentine is obtained. It does not show any more the reaction known under the name "Storch-Morawski's reaction," (see Zeitschrift für angewandte Chemie, 1927, page 100). For sulfonating 1 part of the powdered condensation product is dissolved in 2 parts of sulfuric acid of about 100% strength and heated in this solution at about 20–30° C.

As soon as a sample is soluble in water the melt is poured onto ice, decanted, dissolved in hot water and salted out. The product thus obtainable forms a pale colored powder, soluble in water, which solution is able to precipitate gelatin.

Example 2.—10 parts of colophony are gradually heated with 5 parts of xylyl chloride and 0.2 parts of zinc chloride to 180° C. until gaseous substances are no longer evolved. On cooling, a yellowish brown, brittle mass is obtained.

Example 3.—10 parts of the product obtainable by heating 30 parts of colophony with 10 parts of phenol in the presence of 1.5 parts of sulfuric acid of 60° Bé. for about 8 hours to about 70–80° C., 3 parts of benzylchloride and 0.2 parts of zinc chloride are gradually heated up to 110–120° C. until the development of gaseous substances has nearly ceased. The reaction product thus obtainable is very similar to that described in Example 1. It may easily be sulfonated by means of 2 parts of sulfuric acid of about 100% strength at a temperature of about 70° C. which is gradually lowered to room temperature. The sodium salt of the sulfonic acid thus obtainable is a yellow powder, easily soluble in water.

*Example 4.*—150 parts of colophony and 50 parts of phenol are heated to about 70° C. at which temperature 2 parts of sulfuric acid of 60° Bé. are added. Now the temperature is raised to 110° C. and is held between about 110–120° C. after the addition of 1.5 parts of zinc chloride and 67 parts of benzylchloride until the development of gaseous substances has nearly ceased. After having removed the water formed during the reaction by sucking off, 200 parts of tetrachloroethane are mixed with the melt by stirring at a temperature of 70° C. Now 150 parts of sulfuric acid of 100% strength are gradually added, whereby the temperature is slowly lowered to 45° C. The melt is stirred for some hours at this temperature. Then it is poured onto ice, decanted, neutralized, freed from the tetrachloroethane by steam distillation, and the pale yellow solution thus obtained is treated with sodium chloride until the sodium salt of the sulfonic acid formed separates. It forms a pale yellow powder, easily soluble in water, which solution is stable towards sodium sulfate, alkalies and small amounts of sulfuric acid.

We claim:

1. The process which comprises reacting with an aralkylhalogenide upon a condensation product of a natural resin-acid with a phenol in the presence of a small amount of a suitable dehydrating agent at temperatures ranging from about 100 to 200° C., sulfonating the condensation product and salting out.

2. The process which comprises reacting with an aralkylhalogenide upon a condensation product of colophony with a phenol in the presence of about 1 to 3% of zinc chloride (calculated upon the resinous mass) at temperatures ranging from about 100 to 200° C., sulfonating the condensation product and salting out.

3. The process which comprises reacting upon 10 parts by weight of the product obtainable by treating colophony with phenol with 3 parts by weight of benzylchloride in the presence of 0.2 parts by weight of zinc chloride at a temperature of 110–120° C., adding to 1 part by weight of the condensation product thus obtained two parts by weight of sulfuric acid of about 100% strength at a temperature of about 70° C., gradually lowering the temperature to room temperature and isolating the sulfonic acid formed by salting out.

4. The products obtainable according to the process claimed in claim 1, said products being in the form of their alkali metal salts light yellow to yellow powders easily soluble in water.

5. The products obtainable according to the process claimed in claim 2, said products being in the form of their alkali metal salts light yellow to yellow powders easily soluble in water.

6. The product obtainable according to the process claimed in claim 3, said product being in the form of its sodium salt a yellow powder easily soluble in water.

In testimony whereof we have hereunto set our hands.

ARNOLD DOSER.
GUSTAV MAUTHE.
ALFRED THAUSS.